United States Patent [19]

Borrelli et al.

[11] Patent Number: 4,501,468
[45] Date of Patent: Feb. 26, 1985

[54] INTEGRAL OPTICAL IMAGING DEVICES USING GRIN LENS SYSTEMS

[75] Inventors: Nicholas F. Borrelli, Elmira; Donald B. Keck, Big Flats; David L. Morse; Paul A. Sachenik, both of Corning, all of N.Y.

[73] Assignee: Corning Glass Works, Corning, N.Y.

[21] Appl. No.: 520,458

[22] Filed: Aug. 4, 1983

[51] Int. Cl.³ .................................................. G02B 5/17
[52] U.S. Cl. ............................ 350/96.25; 350/96.31; 350/413
[58] Field of Search ............ 350/96.12, 96.18, 96.25, 350/96.31, 413; 355/1

[56] References Cited

U.S. PATENT DOCUMENTS

| | | | |
|---|---|---|---|
| 3,544,190 | 12/1970 | Moorhusen et al. | 350/6.3 |
| 3,667,832 | 6/1972 | Kitano et al. | 350/413 |
| 4,141,642 | 2/1979 | Nagai et al. | 355/1 |
| 4,345,833 | 8/1982 | Siegmund | 355/1 |
| 4,403,031 | 9/1983 | Borrelli et al. | 430/332 |

Primary Examiner—John Lee
Attorney, Agent, or Firm—C. S. Janes, Jr.

[57] ABSTRACT

An integral optical imaging device is disclosed in which two or more porous glass bodies, embodying arrays of cylindrical gradient index lens systems, are rigidly maintained in a stacked relationship such that the lens systems are in register. This enhances the accumulative lens power and effective thickness of the device.

4 Claims, 2 Drawing Figures

INTEGRAL OPTICAL IMAGING DEVICES USING GRIN LENS SYSTEMS

BACKGROUND OF THE INVENTION

This invention relates to integral optical devices based on optical patterns created in porous glass bodies. In one embodiment of particular interest, the pattern is in the nature of an array of cylinders extending through the glass body. Each cylinder has a prescribed radial, gradient, refractive index distribution. The distribution varies with radial distance, that is from the axial center line of the cylinder to the outside, in a parabolic manner, whereby lens-like properties are derived. In a specific improved construction, an array of cylindrical lens systems is capable of providing a single one-to-one erect conjugate image as required for such purposes as photo-copying.

Ser. No. 277,089, filed June 25, 1981 by two of us (Borrelli and Morse), now U.S. Pat No. 4,403,031, discloses a method of producing an optical pattern in a porous glass by impregnating the glass with a photolyzable organometallic material and selectively photolyzing the impregnated glass. Among the optical patterns that may be created are gradient refractive index patterns, such as lenses, and optical density patterns.

The patent application defines a photolyzable organometallic as one which undergoes bond scission on exposure to light to produce a photolyzed metal-organic intermediate. This intermediate is preferably reactive, that is capable of reacting with the pore surfaces via hydroxyl groups to form coordination complexes or stronger bonds.

A porous glass is described as one incorporating a multiplicity of interconnected pores of submicron diameter into which the organometallic can be introduced as a liquid or a gas. Preferably, such glass is produced by phase separation and leaching techniques disclosed in U.S. Pat. Nos. 2,106,744, 2,215,036 and 2,221,709.

In accordance with the prior application disclosure, the organometallic material in unphotolyzed areas of the glass may be removed, as by washing or volatilizing, to restore the glass to a porous state. This avoids subsequent reactions in these areas which could blur or distort the pattern introduced. Also, the porous glass may be consolidated to a non-porous state if desired, but this is a high temperature step that may itself distort optical properties.

A companion application, Ser. No. 520,457 is being filed of even date herewith by N. F. Borrelli et al. and is entitled "Integral Optical Device and Method". That application discloses filling the pores with a polymerizable, organo functional silicone fluid. This seals the device against absorption of foreign material and moisture. More important, however, after a subsequent heat treatment, this procedure provides two unexpected benefits. First, the lens power, that is the optical strength of the lens created by photolysis, is greatly enhanced. Further, the matrix glass surface is rendered opaque.

As explained in the companion application, it has been recognized that an imaging device, capable of providing a one-to-one erect conjugate image, might be provided if (1) adequate optical strength could be imparted to the individual lens by enhancing the refractive index differential created in the lens, or if (2) a glass thickness greater that the normal 2 mm might be used. To this end, efforts were made to extend the exposure time, thereby enhancing the photolysis effect, and/or the depth of treatment in a porous glass body.

The basic aim was twofold: (1) to enhance the radial gradient index effect, and hence the lens power, and (2) extend this effect through the entire thickness of the glass body in as nearly uniform manner as possible. It was found, however, that extended exposure tended to create a severe axial dependence of the radial refractive index gradient along the optical axis of the exposure radiation. This in turn caused distorted and non-symmetric imaging. Further, such ill effects increased sharply with exposure time.

It appeared critical then to limit exposure time, even though this failed to provide sufficient radial index change for the desired imaging effect. As a rule of thumb, glass thicknesses over about 2 mm were avoided, since the requisite exposure to achieve a reasonable power on the back surface was too great.

PURPOSE OF THE INVENTION

A basic purpose then is to provide an improved construction for an imaging device based on optical patterns as disclosed in U.S. Pat. No. 4,403,031.

Another purpose is to provide such an improved device wherein the pattern is an array of lens systems.

A further purpose is to provide an imaging device that is capable of providing a one-to-one erect conjugate image.

A particular purpose is to provide an imaging device having improved imaging characteristics without loss of image clarity or fidelity.

Another particular purpose is to provide an imaging device that is based on lens arrays created in accordance with U.S. Pat. No. 4,403,031, and that has an effective thickness greater than 2 mm.

SUMMARY OF THE INVENTION

To these, and other ends that will become apparent, our invention is an integral optical imaging device composed of at least two porous glass bodies each having an array of cylindrical lens systems extending through the body, the lens systems having a prescribed gradient radial refractive index and being formed by photolysis of an organometallic compound in the glass pores, each cylinder terminating on opposite faces of the glass body in planar surfaces that function as lens-like elements, the glass bodies being rigidly maintained in a stacked relationship such that each lens system in one body is in registry with a corresponding lens system in the adjacent body, whereby the device has the effective thickness for imaging purposes of the two or more bodies.

The invention further contemplates a method of producing an optical imaging device which comprises impregnating at least two porous glass bodies with a photolyzable organometallic compound, each such body being not over about 2 mm in thickness, exposing each impregnated body to a source of photolyzing light that is identically patterned to selectively expose certain portions of the body and thereby photolytically convert at least some of the organometallic compound in exposed areas of the glass to form an array of lens systems, arranging the two or more patterned glass bodies in stacked relationship such that each lens system in each glass body is aligned in registry with a corresponding system in each other patterned glass body, and the composite thus formed is rigidly maintained in such fixed relationship, whereby the effective thickness of the device is increased.

PRIOR LITERATURE

U.S. Pat. No. 4,168,900 (Adachi) describes an erect optical imaging system for copying apparatus comprising a first pair of array sets of object lenses and a second pair of array sets of relay lenses spaced from and aligned with the first pair, the first pair producing a real image and the second set producing an erect image. In each pair, one array is offset relative to the other. The lenses are square bars of glass or plastic that are 2 mm on a side.

U.S. Pat. No. 3,658,407 (Kitano et al.) discloses an optical imaging device composed of glass fibers having flat ends that function as lens-like elements. Each fiber has a radial gradient refractive index distribution imparted by ion exchange.

U.S. Pat. No. 3,605,593, reissued as No. 28,162 (Anderson), discloses an optical imaging apparatus embodying a pair of mosaics having lens arrays which image small portions of an object into a larger composite image.

Such an apparatus is further discussed by Anderson in an article entitled, "Close-up Imaging of Documents and Displays with Lens Arrays", in the Feb. 15, 1979 issue of *Applied Optics*, Vol. 18, No. 4.

U.S. Pat. No. 3,544,190 (Moorhusen) also discloses an apparatus for forming a continuous image from an object at 1:1 magnification. A lens strip optical imaging system in this apparatus has a series of individual optical imaging devices with an internal field stop. The lens strips are molded in plastic.

GENERAL DESCRIPTION

Figure 1:
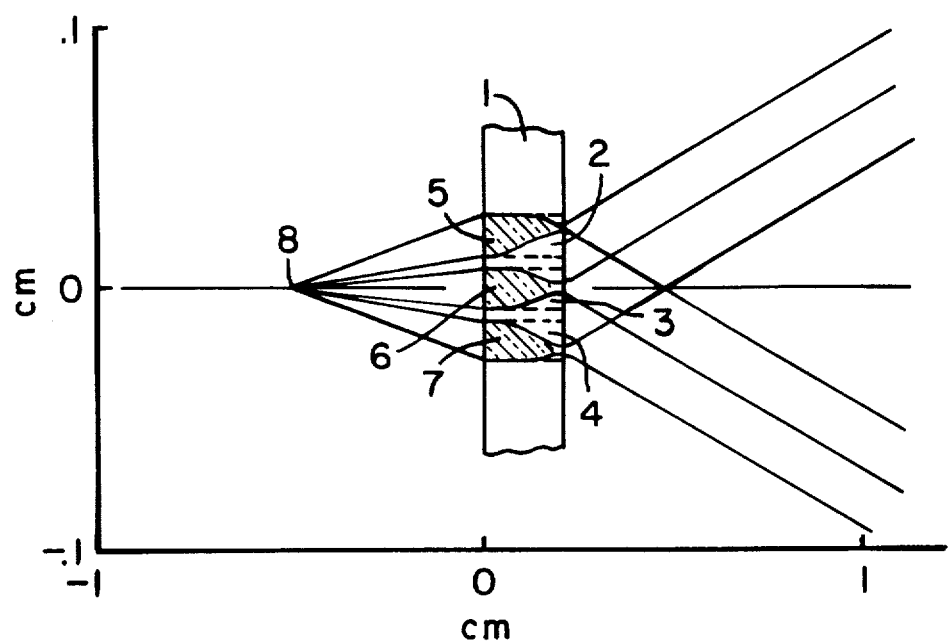
FIG. 1 is a schematic side elevation in cross section of a porous glass body having an array of three cylindrical lens systems extending through the body and having a gradient radial refractive index.

U.S. Pat. No. 4,403,031 fully discloses the materials and process parameters for producing optical patterns in porous glass by selective photolysis of an impregnated organometallic compound. To avoid repetition, that application is incorporated herein in its entirety and reference is made thereto. In general, the application discloses a variety of organic types that may be used. As for the metal component, this may be selected from Groups IIIB, IVA, IVB, VB, VIB, VIIB and VIII of the Periodic Table.

We have obtained optimum results for present purposes with Group IVB organometallic alkyls and alkyl halides, such as iodotrimethylstannane ($ISnMe_3$), hexamethyldistannane ($Me_6Sn_2$), bromotrimethylgermane ($BrGeMe_3$) and iodotrimethylsilane ($ISiMe_3$). Among other metals that may form useful organometallics, and that are recognized as having catalytic capabilities, are manganese, iron, titanium, chromium, tungsten, cobalt, vanadium, hafnium, zirconium, niobium, and tantalum.

To develop an optical pattern, a porous glass body may be completely impregnated with an organometallic compound or solution of the same. The glass is then exposed to a source of photolytic radiation, e.g., a mercury arc lamp, through an opaque mask wherein the pattern is formed as clear, transparent areas. Thus, the organometallic, in the pores under the pattern areas of the mask, is photolyzed while adjacent areas are unchanged. The photolysis products react with or become bonded to the glass. The unphotolyzed material may be removed by washing or volatilization.

As explained earlier, it has been found that glass bodies greater than about 2 mm in thickness cannot be satisfactorily treated with photolytic radiation. When an adequate exposure through the glass is undertaken, it is found that a gradient also develops in an axial direction in the lens system. This causes distortion and lack of symmetry in an image.

In accordance with our present improvement, an effective thickness greater than about 2 mm may be achieved by treating two or more strips of glass of 2 mm or less thickness and then bringing these together in a stacked relationship.

It is, of course, necessary to develop the same pattern in each glass body. Then the bodies are aligned in registry such that each lens system in one body is in registry with a corresponding system in each other body. Approximate registry can be attained by care in applying the patterning mask in the same manner on each glass body. Once an approximation is achieved maximum light intensity devices may be employed in known manner to precisely align the lens systems.

The bodies may be mechanically locked in the desired relationship. However, it will usually be preferable to seal the glass bodies together with a soft glass, an organic resin, or other known sealant. If the sealant is an interlayer, it must of course be clear and transparent. To avoid optical imperfections in an interlayer, sealing at the corners may be employed.

Usually, it is desirable, in a lens system of the present nature, to maintain a constant, or consistent, radial distribution of refractive indices throughout the length of the lens, that is the glass thickness. In other words, it is desirable to approximate a single parabolic distribution curve through the glass, that is along the cylindrical lens system. Exposure of a glass body to photolytic radiation is usually from one surface only, thus creating an inherent non-uniformity. This has been found critical when glass over about 2 mm in thickness is employed. It appears that the amount of exposure, or at least the effect which it creates, tends to diminish with depth of penetration of the radiation. This in turn creates a gradual change in the parabolic curve defining the radial gradient. This renders the strength and shape of the radial gradient axially dependent which, in turn, creates distortion in a transmitted image.

We have now found that this difficulty can be overcome by stacking two thinner samples. The optical processing for thin sample $\leq 2$ mm produces little or no axial variations in the radial refractive index gradient thus allowing optimum performance to be maintained. The expression relating the one-to-one conjugate working distance to the lens thickness, "D" and strength of the radial index gradient "L", is given by $$C = L/\pi_c \tan(D/2L)$$

where

C = one-to-one conjugate working distance
D = lens thickness
$n_o$ = refractive index of lens along the center line
L = radial index gradient parameter defined by $$n = n_o(1 - r^2/2L^2)$$

r = lens radius

For the case of a stack of equal radial gradient one can replace D with the sum of the thicknesses of the individual elements of the stack. This is the preferable case, but even with unequal radial gradients, the stack concept still is valid. In this case, one defines an effective L value, assuming two layers, as $$L_{eff} = \frac{D_1 + D_2}{D_1/L_1 + D_2/L_2}$$

and uses it in the above equation in the place of L.

The optical imaging device of the present invention will now be described with reference to the appended drawings.

FIG. 1 illustrates a porous glass body 1 having an array of three cylindrical lens systems 2, 3, and 4 extending through said body. Each of the lens systems has a gradient radial refractive index as is evidenced by the curvature of the rays 5, 6, and 7 traced within each lens from object 8. As can be observed, the array does not image 1:1 but, instead, forms three individual images.

Figure 2:
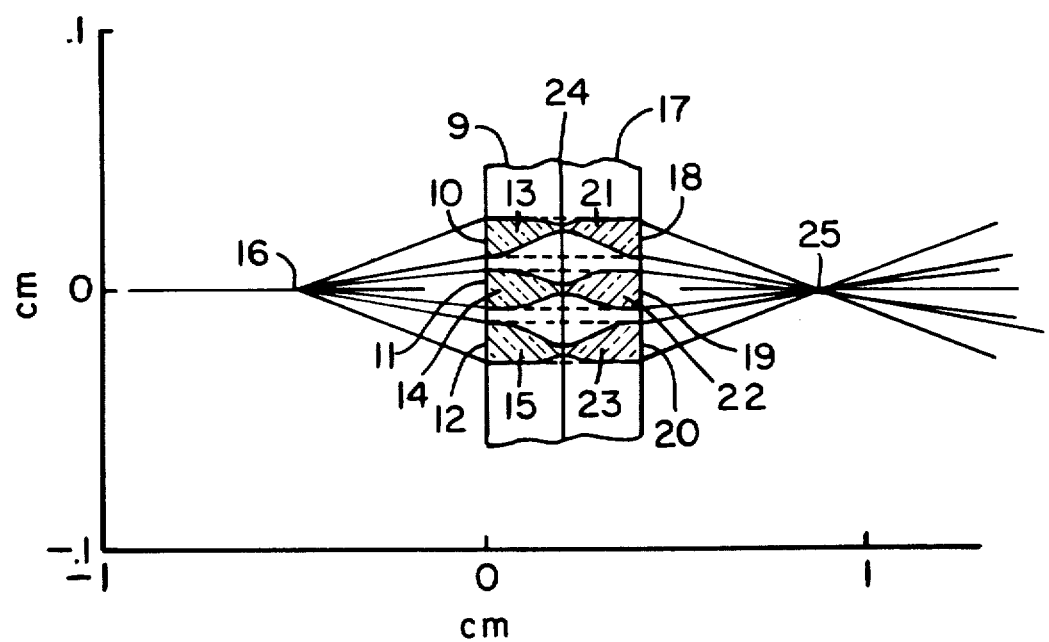
FIG. 2 is a schematic side elevation in cross section of two porous glass bodies in contacting or stacked relationship having an array of three cylindrical lens systems extending through the body and having a gradient radial refractive index, wherein said bodies are so positioned that the two lens systems are in registry with each other.

FIG. 2 illustrates the integral optical imaging device of the present invention. Porous glass body 9 has an array of three cylindrical lens systems 10, 11, and 12 extending through said body; each lens system having a gradient radial refractive index as is evidenced through the curvature of rays 13, 14, and 15 traced within each lens from object 16. (In essence, the three lens array in porous glass body 9 is a counterpart of the three lens array depicted in FIG. 1. )

Porous glass body 17 also has an array of three cylindrical lens systems 18, 19, and 20 extending through said body; each lens system having a gradient radial refractive index as is evidenced through the curvature of rays 21, 22, and 23 traced within each lens.

In FIG. 2, porous glass body 17 is shown in contacting or stacked relationship along line 24 with porous glass body 9 to form a composite, wherein lens systems 18, 19, and 20 are in registry with lens systems 10, 11, and 12 such that the composite of the two bodies produces an image 25 of object 16.

SPECIFIC DESCRIPTION

The invention is further described with reference to several studies illustrating specific characteristics.

A first group of porous glass samples 2 mm in thickness was prepared by impregnating the glass with iodotrimethystannane. Each impregnated sample was then exposed through a multi-aperture mask having 150 micron, close packed, clear apertures. The exposure was to a 500 watt xenon lamp for two (2) hours. The samples were then washed to remove unphotolyzed material from the unexposed zones.

Four glass samples were selected for measurements, and for calculation of a gradient parameter in terms of the equation, $$n = n_o(1 - r^2/2L^2)$$

where n = refractive index of untreated glass
$n_o$ = refractive index at center of lens
r = ½ of lens diameter From the lens diameter and the gradient parameter values, a value D/L was calculated as a measure of lens power or strength for each sample.

The four samples were separated in pairs, and each pair stacked with the lens systems in registry. Samples were stacked with the respective front or exposed faces turned outward. An adhesive/sealant, available from Dow-Corning Corporation, Midland, Michigan, under the designation SILASTIC 732 RTV, was applied at each corner to rigidly bond the stacked pairs. Again measurements and calculations were made on the stacked samples.

Thereafter, the two composite bodies were further stacked and sealed, again with the lens systems in registry and exposed faces turned outward. The result was a four-layer stack of about 8 mm total thickness, and final measurements were made thereon.

Table 1 below records sample numbers with hyphenated numbers identifying stacks. The table further records calculated L and D/L values, the latter in degrees. It may be noted that a D/L value of 189.5° is necessary to transmit a one-to-one erect conjugate image with a 1 cm working distance.

TABLE 1

| Sample | L | D/L (degrees) |
|---|---|---|
| 11 | 0.240 | 47.8 |
| 18 | 0.231 | 49.6 |
| 17 | 0.255 | 44.8 |
| 14 | 0.211 | 54.3 |
| 11-18 | 0.227 | 101 |
| 14-17 | 0.219 | 104.3 |
| 11-18-14-17 | 0.224 | 204 |

Two samples of about 2.2 mm thick, commercially available, Code 7930 porous glass (Corning Glass Works) were impregnated with iodotrimethylstannane as described above. These samples were then exposed to radiation in the range of 490 nanometers and up from a 2500 watt mercury xenon lamp. The exposure was through a multi-aperture system having 150 micron diameter clear holes and center-to-center separation of 207 microns. Exposure time was two (2) hours. The impregnated glass samples were then washed to remove unphotolyzed organometallic, and baked to fix the photolysis product in the pores.

The optically patterned samples thus produced were then immersed in a 90% solution of the polymerizable organo functional silicone fluid available under the designation DC 1107. The solvent was xylenes in amount of 10% by weight. The samples remained immersed for 24 hours, and then were removed and wiped. This was followed by baking for about four (4) hours in a water vapor atmosphere at 110° C. The immersion was then repeated, and the samples dried and baked at 110° C. for about one (1) hour in a dry atmosphere. The second impregnating treatment was undertaken to ensure complete filling of the pores with fluid, and total polymerization in the lens zones, to provide clear, stable lens arrays.

The lens power (D/L) in each array was calculated on the basis of measurements made (1) as initially formed by hydrolysis, (2) after the first silicone treatment, and (3) after the second treatment. The calculated values are shown in Table 2 below with "imp." indicating impregnation, FB indicating front surface and BF back surface. FB means object side corresponds to initial exposure side, BF means object side corresponds to opposite to exposure side. The agreement between the BF and FB measurement indicates little axial asymetry.

TABLE 2

| Sample | D/L (initial) | | D/L (1st imp.) | | D/L (2nd imp.) | |
|---|---|---|---|---|---|---|
| | FB | BF | FB | BF | FB | BF |
| 1 | 49.1° | 47.9° | 96.7° | 96.7° | 96.7° | 96.7° |
| 2 | 47.3° | 45.8° | 96.8° | 96.8° | 96.8° | 96.8° |

To achieve a 1:1 conjugate image with one cm. spacing in a photocopier, an accumulative D/L of 189.5° at 4 mm. glass thickness in required. This is in accordance with the equation:

$$C = -L/n_o \tan(D/2L)$$

where C = conjugate distance
D = glass sample thickness
$n_o$ = refractive index of porous glass
L = a constant derived from $$n = n_o(1 - r^2/2L^2) \text{ where}$$

r = lens radius

Accordingly, samples 1 and 2 were selected for stacking to provide the necessary power. The samples were visually placed in register, and then more closely aligned by maximum light transmission equipment. The resulting stack was then corner sealed with silicone adhesive as before. The composite body had the requisite lens power (D/L) of 189.5° to permit 1:1 erect conjugate imaging at one cm. distance with resolution of ten (10) line pairs/mm.

We claim:

1. An integral optical imaging device composed of at least two porous glass bodies each having an array of lens systems having the configuration of cylinders extending through the body, the lens systems having a prescribed gradient radial refractive index and being formed by photolysis of an organometallic compound in the glass pores, each cylinder terminating on opposite faces of the glass body in planar surfaces that function as lens-like elements, the glass bodies being rigidly maintained in a stacked relationship such that each lens system in one body is in registry with a corresponding lens system in the adjacent body, whereby the device has the effective thickness for imaging purposes of the two or more bodies.

2. An imaging device in accordance with claim 1 wherein the accumulative value for lens power (D/L) is at least 189.5° and the glass thickness is at least 4 mm whereby a one-to-one erect conjugate image may be attained.

3. An imaging device in accordance with claim 1 wherein the glass bodies are rigidly maintained in a stacked relationship by being sealed to one another by an organic resin.

4. An imaging device in accordance with claim 1 wherein the glass bodies are rigidly maintained in a stacked relationship by being sealed to one another by a soft glass.

* * * * *